(12) United States Patent
Lee et al.

(10) Patent No.: US 11,066,131 B2
(45) Date of Patent: Jul. 20, 2021

(54) MOORING ROPE DEVICE OF FLOATING OFFSHORE STRUCTURE FOR AVOIDING SHIP COLLISION, METHOD FOR OPERATING SAME, AND METHOD FOR INSTALLING SAME

(71) Applicant: Korea Institute of Ocean Science & Technology, Ansan-si (KR)

(72) Inventors: Kang Su Lee, Incheon (KR); Do Youb Kim, Daejeon (KR); Byoung Jae Park, Daejeon (KR); Hyun Seok Kim, Seoul (KR)

(73) Assignee: Korea Institute of Ocean Science & Technology, Gyeonggi-do (KR)

( * ) Notice: Subject to any disclaimer, the term of this patent is extended or adjusted under 35 U.S.C. 154(b) by 0 days.

(21) Appl. No.: 16/649,333

(22) PCT Filed: Aug. 20, 2018

(86) PCT No.: PCT/KR2018/009537
§ 371 (c)(1),
(2) Date: Mar. 20, 2020

(87) PCT Pub. No.: WO2019/059535
PCT Pub. Date: Mar. 28, 2019

(65) Prior Publication Data
US 2020/0231253 A1 Jul. 23, 2020

(30) Foreign Application Priority Data
Sep. 21, 2017 (KR) ........................ 10-2017-0121914

(51) Int. Cl.
*B63B 22/04* (2006.01)
*B63B 22/02* (2006.01)
*F16H 7/02* (2006.01)

(52) U.S. Cl.
CPC ............ *B63B 22/021* (2013.01); *B63B 22/04* (2013.01); *F16H 7/02* (2013.01)

(58) Field of Classification Search
CPC . B63B 22/021; B63B 22/04; B63B 2021/009; F16H 7/02
See application file for complete search history.

(56) References Cited

U.S. PATENT DOCUMENTS 3,979,785 A * 9/1976 Flory .................... B63B 22/021
441/5
4,176,615 A * 12/1979 Reid ..................... B63B 22/021
441/133
(Continued)

FOREIGN PATENT DOCUMENTS

KR 10-2010-0124733 A 11/2010
KR 10-2012-0020357 A 3/2012
(Continued)

OTHER PUBLICATIONS

International Search Report PCT/ISA/210 for International Application No. PCT/KR2018/009537 dated Dec. 11, 2018.

*Primary Examiner* — Jason K Niesz
(74) *Attorney, Agent, or Firm* — Harness, Dickey & Pierce, P.L.C.

(57) ABSTRACT

A floating offshore mooring chain apparatus for preventing collision with a ship is proposed. The mooring chain apparatus includes a buoyant body floating on the water surface to transfer resources to a transport ship, a plurality of mooring chains fixed to the seabed to locate the buoyant body in position on the water surface, and a plurality of spider buoys disposed to a lower portion of the buoyant body such that the mooring chains laterally penetrate through the spider buoys, respectively, and extend toward the seabed in (Continued)

different directions, so that the mooring chains are moved by a rotating force along the extension directions thereof to displace the buoyant body.

10 Claims, 7 Drawing Sheets

(56) References Cited

U.S. PATENT DOCUMENTS

| | | |
|---|---|---|
| 4,279,047 A | 7/1981 | van Heijst |
| 4,617,000 A | 10/1986 | Girardot et al. |
| 7,959,480 B2 * | 6/2011 | Lindblade ............. B63B 22/025 |
| | | 441/3 |

FOREIGN PATENT DOCUMENTS

| | | |
|---|---|---|
| KR | 10-2012-0079447 A | 7/2012 |
| WO | WO-2004-078578 A1 | 9/2004 |
| WO | WO-2010-008302 A1 | 1/2010 |

* cited by examiner

MOORING ROPE DEVICE OF FLOATING OFFSHORE STRUCTURE FOR AVOIDING SHIP COLLISION, METHOD FOR OPERATING SAME, AND METHOD FOR INSTALLING SAME

CROSS-REFERENCE TO RELATED APPLICATIONS

This application is a national phase under 35 U.S.C. § 371 of PCT International Application No. PCT/KR2018/009537 which has an International filing date of Aug. 20, 2018, which claims priority to Korean Patent Application No. 10-2017-0121914, filed Sep. 21, 2017, the entire contents of each of which are hereby incorporated by reference.

TECHNICAL FIELD

The present invention relates to a floating offshore mooring chain apparatus for avoiding collision with a ship and, more specifically to, a floating offshore mooring chain apparatus located in place on the water surface, with a plurality of mooring chains or ropes provided thereto, so that resources are transferred between the mooring chain apparatus and ships with deep draft, which cannot enter ports due to draft limitations, and that the mooring chain apparatus is able to actively move when there is a risk of collision with the drifting transport ship due to environmental forces such as waves, currents, winds, and etc., and the operation method and installation method thereof.

BACKGROUND ART

In general, offshore structures may be installed for the development and production of subsea oil and gas fields, and may also be used as port structures at which large transportation ships are moored for loading and unloading.

In addition, these offshore structures are of various types such as a submerged type and a floating type, wherein the submerged type includes a fixed type and a gravity type, and the floating type includes a floating type, a semi-submersible type, and a submersible type, depending on the installation positions of the offshore structures in the sea.

In addition, in order to moor a large transport ship with a deep draft at a port, it is necessary for the port to have a water depth suitable for the draft. To satisfy this condition, however, such a port should be extended from the offshore to a place in the sea where the depth of water is deep, or otherwise be constructed to have the depth of water suitable to the deep draft. However, these solutions have a problem in that construction costs are high. Accordingly, for a large transport ship, it is advantageous that floating offshore structures be installed at a place in the sea away from the offshore for the transfer of resources between the transport ship and the offshore structures.

Offshore structures floating in a certain area of the sea are fixed to the seabed by mooring chains so that they are floated in position on the water surface during the transfer of resources with the transport ship, wherein the mooring method consists of a one-point mooring method, a multi-point mooring method, and a dynamic positioning system.

The one-point mooring method includes a Catenary Anchor Leg Mooring (CALM)) type, a Single Anchor Leg Mooring (SALM) type, a Yoke type, and a Turret type, and is widely used for oil unloading relative to a fixed-type structure method in deep water depths. The fixed-type structure method has low maintenance cost and high utilization rate of oil unloading, but it also has high initial facility investment cost, whereas the one-point mooring method has high maintenance cost, but it has low initial investment cost of the facility.

However, in such an offshore structure, a symmetrical mooring chain installed alone should secure the length of the preliminary mooring chain in consideration of the position change, and it is difficult to actively move the position on the surface of the sea, having the risk of collision with the transport ship drifting on the surface by environmental forces.

To solve this problem, research is actively taking place on a floating offshore mooring chain apparatus for avoiding collision with a ship, in which apparatus a plurality of mooring chains are fixed to the seabed so that the mooring chain apparatus is floated in position on the surface of the sea, there is no need to secure the length of the preliminary mooring chain in consideration of the position change, thereby reducing the cost of securing the weight and accommodation space thereof, and the prolonged mooring chains and allowing for active movement of position upon drifting of a transport ship, avoiding the collision with the drifting ship.

As a conventional mooring chain apparatus for avoiding collision with ships, an offshore drilling, production, storage and unloading buoyancy structure has been proposed in Korean Patent Laid-open Publication No. 10-2012-0079447 (2012.07.12). The buoyancy structure is used for storage of petrochemicals and unloading of tankers. The buoyancy structure performs transport of products and integrated work of a superstructure in the dock while maintaining symmetry about a vertical axis, the center of gravity positioned below the center of buoyancy, the vertical motion damping characteristics that do not require an anchoring system using a vertical tensioning chain, and a safety characteristic against overturning at the installation site.

However, these offshore buoyancy drilling, production, storage, and unloading structures are equipped with a plurality of mooring chains for positioning the offshore structures on the surface of the sea, so the length of the preliminary mooring chains in consideration of the positional movement must be secured. This causes an increase in cost for securing the weight and accommodating space of the offshore structures, and extended mooring chains, and it is difficult to move the position actively upon drifting of a transport ship, so the offshore structures have inefficient features.

DISCLOSURE

Technical Problem

Accordingly, the present invention has been made keeping in mind the above problems occurring in the related art, and the present invention is intended to propose a floating offshore mooring chain apparatus for preventing collision with a ship, wherein the mooring chain apparatus is provided with a plurality of mooring chains variable therethrough for transferring resources to a transport ship so that the mooring chains are fixed to the seabed, thereby positioning the mooring chain apparatus in position on the water surface without securing the length of the preliminary mooring chain and active movement of the offshore structure is allowed while the length of the mooring chains is varied, thereby preventing the collision with the transport ship drifting along the water surface.

Technical Solution

In order to achieve the above object, according to one aspect of the present invention, there is provided a floating offshore mooring chain apparatus for preventing collision with a ship, the mooring chain apparatus including: a buoyant body floating on the water surface to transfer resources to a transport ship; a plurality of mooring chains fixed to the seabed to locate the buoyant body in position on the water surface; and a plurality of spider buoys disposed to a lower portion of the buoyant body such that the mooring chains laterally penetrate through the spider buoys, respectively, and extend toward the seabed in different directions, so that the mooring chains are moved by a rotating force along the extension directions thereof to displace the buoyant body.

In an exemplary embodiment, each of the spider buoys may include: a plurality of housings provided underneath the buoyant body such that the mooring chains laterally penetrate through the housings, respectively, and extend in the seabed; a pair of mooring chain stoppers provided inside the housing such that the mooring chain stoppers are spaced apart from each other so as to be engaged with the mooring chain, wherein in operation, when rotated, the mooring chain stopper engaged with the mooring chain moves the housing along the mooring chain, resulting in the extended length of the mooring chain in different direction being varied; and a driving motor connected to one side of the mooring chain stopper to transmit a rotating force to the mooring chain stopper.

In an exemplary embodiment, the mooring chain apparatus may further include: a pair of sub gears respectively provided on one-sides of the mooring chain stoppers so that the mooring chain stoppers are rotated by the rotating force from the driving motor; and a chain belt provided so as to be meshed with the sub gears so that the sub gears are rotated by the rotating force transmitted from the driving motor.

In an exemplary embodiment, the mooring chain apparatus may include a guide roller provided so as to be symmetrical to the mooring chain stopper about the mooring chain inside the housing such that the guide roller presses one side of the mooring chain so that the mooring chain is closely abutted against and meshed with the mooring chain stopper.

In an exemplary embodiment, the spider buoys may include a rotary shaft provided to connect the housings to the lower portion of the buoyant body through the center of the housings such that the respective housings are rotatable at 0 to 120 degrees.

In an exemplary embodiment, the rotary shaft may be connected to the lower portion of the buoyant body through the center of the housings such that the spider buoy and the buoyant body, and adjacent housings are respectively spaced apart from each other.

In an exemplary embodiment, the mooring chain apparatus may include guide portions symmetrically provided on both sides, respectively, of the housing, so as to guide the mooring chain such that the extended length of the mooring chain by the mooring chain stopper is varied.

In an exemplary embodiment, in the spider buoy, as the mooring chain stopper rotates to vary the extended length of the mooring chain, the position of the buoyant body may be moved to prevent the collision with a transport ship drifting along the water surface by environmental forces.

In another aspect, a method of operating a floating offshore mooring chain apparatus for preventing collision with a ship includes: (A) a stage in which a transport ship drifts along the water surface; (B) a stage in which the driving motor of the spider buoy operates in response to the movement of the transport ship; (C) a stage in which the mooring chain stopper of the spider buoy rotates in response to the operation of the driving motor in the stage (B); and (D) a stage in which the buoyant body moves together with the movement of the housing according to the rotation of the mooring chain stopper in the stage (C).

In a further aspect, a method of installing a floating offshore mooring chain apparatus for preventing collision with a ship includes: (a) a stage of fixing one end of the mooring chain to the seabed; (b) a stage of fastening the mooring chain and the spider buoy by allowing another end of the mooring chain to pass through the spider buoy and fix the passed end to the seabed; (c) a stage of coupling the buoyant body to the spider buoy fastened in the stage (b); and (d) a stage of connecting the transport ship to the buoyant body coupled in the stage (c).

Advantageous Effects

According to the present invention, the floating offshore structure is provided with the plurality of mooring chains extending therethrough for transferring resources to a transport ship so that the mooring chains are fixed to the seabed, thereby positioning the offshore structure in position on the water surface without securing the length of the preliminary mooring chain in consideration of the positional movement of the offshore structure so that the weight and space of the offshore structure, and mooring cost are reduced, and so that active movement of the offshore structure is allowed while the length of the mooring chains is varied, thereby preventing the collision with the transport ship drifting along the water surface.

DESCRIPTION OF REFERENCE NUMERALS
FOR MAJOR PARTS OF THE DRAWINGS

| | |
|---|---|
| 3: Transport ship | 4: Resource supply path |
| 100: Buoy body | 200: Mooring chain |
| 300: Spider buoy | 310: Housing |
| 311: Guide portion | 312: Rotary shaft |
| 320: Mooring chain stopper | 321: Sub gear |
| 322: Chain belt | 330: Drive motor |
| 340: Guide roller | |

BEST MODE

Preferred embodiments of a floating offshore mooring chain apparatus for preventing collision with a ship according to the present invention will now be described in detail with reference to the accompanying drawings.

In this process, the thickness of the lines or the size of components shown in the drawings may be exaggerated for clarity and convenience of description, which is intended to allow the invention to be easily implemented by a person having ordinary knowledge in the art, so that it is not meant that the technical spirit and scope of the invention are limited.

In addition, the embodiments below are not intended to limit the scope of the present invention, but merely to be presented as examples, and there may be various embodiments implemented through the technical idea.

The terms to be described later are terms defined in consideration of functions in the present invention, which may vary according to a user's or operator's intention or practice, and definitions of these terms should be made based on contents throughout the present specification.

The floating offshore mooring chain apparatus 1 for preventing collision with a ship according to the present invention, as illustrated in FIGS. 1 to 5, includes a buoyant body 100 which floats on the water surface to transfer resources to a transport ship 3; a plurality of mooring chains 200 fixed to the seabed such that the buoyant body 100 is located in position on the water surface; and a plurality of spider buoys 300 disposed underneath the buoyant body 100 such that the mooring chains 200 laterally penetrate through the spider buoys, respectively, and extend toward the seabed in different directions, so that the mooring chains 200 are moved by a rotating force along the extension directions thereof to displace the buoyant body 100.

Here, the buoyant body 100 is provided in a floated state to transfer resources to the transport ship 3. Specifically, the buoyant body is floated in position on the water surface to transfer resources to a large transport ship 3, which is difficult to enter a port due to deep draft of the ship, through a resource supply path 4.

The plurality of mooring chains 200 are provided so that the above-described buoyant body 100 is located in position under the environmental forces. To this end, the mooring chains 200 are provided so as to extend to the seabed through the spider buoys 300 and be fixed to the seabed.

One or more spider buoys 300 are provided at a lower portion of the buoyant body 100 described above such that the mooring chains 200 laterally penetrate through the spider buoys, respectively, in different directions, and extend to the seabed so that the mooring chains 200 are moved by a rotating force along the extension directions thereof to displace the position of the buoyant body 100. In this way, while the spider buoys 300 are moved in various directions along the mooring chains 200 by the rotating force, the floating position of the buoyant body 100 is moved.

The spider buoy 300 includes a housing 310, a mooring chain stopper 320, and a driving motor 330, such that the buoyant body 100 is moved by changing the extension length of the mooring chain 200 extending into the sea while exerting a rotating force.

One or more housings 310 are provided underneath the buoyant body 100 such that the mooring chains 200 laterally penetrate through the housings, respectively, and extend to the seabed. The mooring chains 200 are provided to extend to the seabed in different directions.

Figure 1:
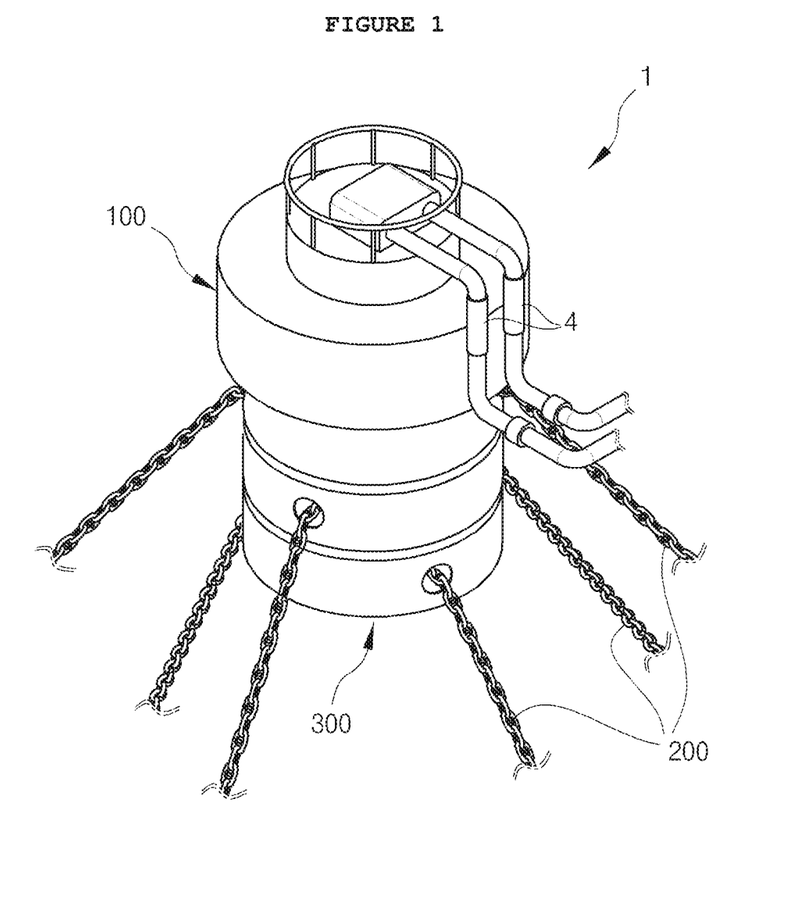
FIG. 1 is a perspective view illustrating a floating offshore mooring chain apparatus for preventing the collision with a ship according to an embodiment of the present invention.
Figure 2:
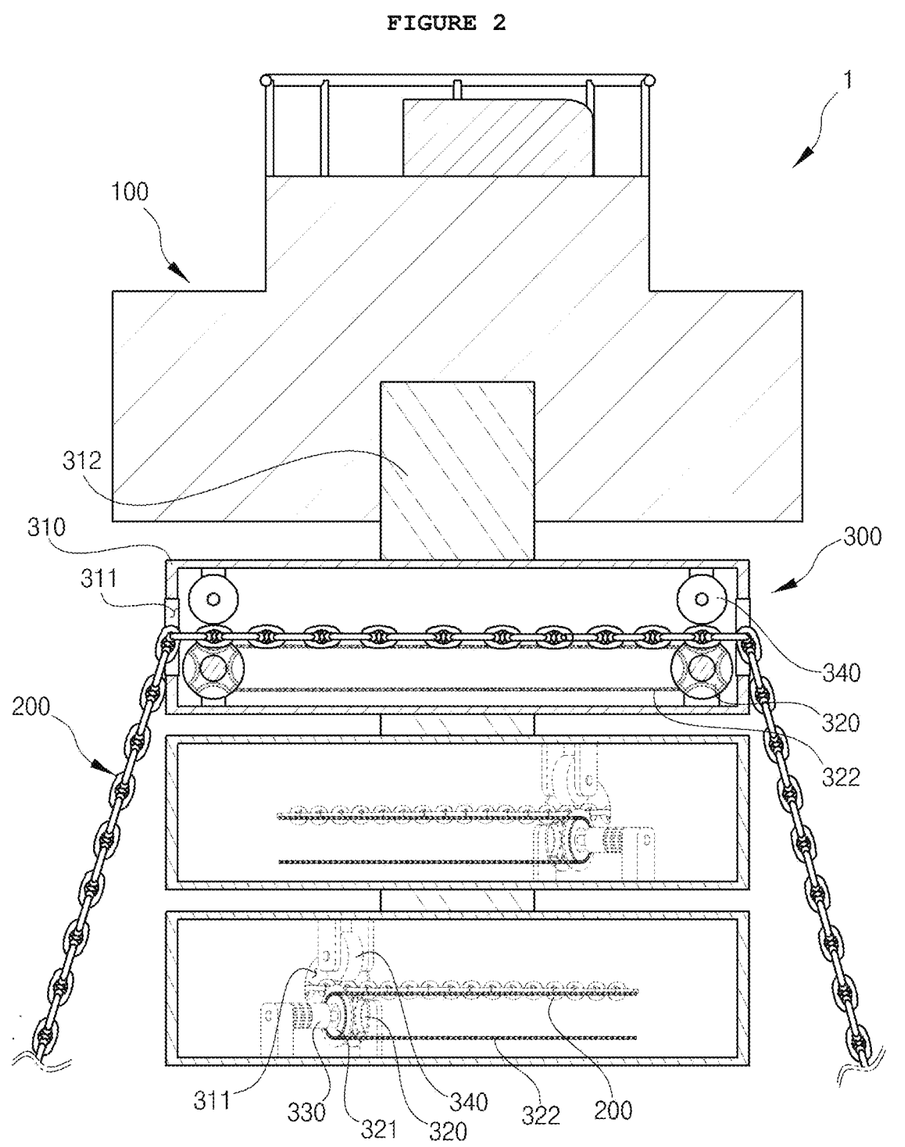
FIG. 2 is a side cross-sectional view illustrating the floating offshore mooring chain apparatus for preventing the collision with a ship according to the embodiment of the present invention.
Figure 3:
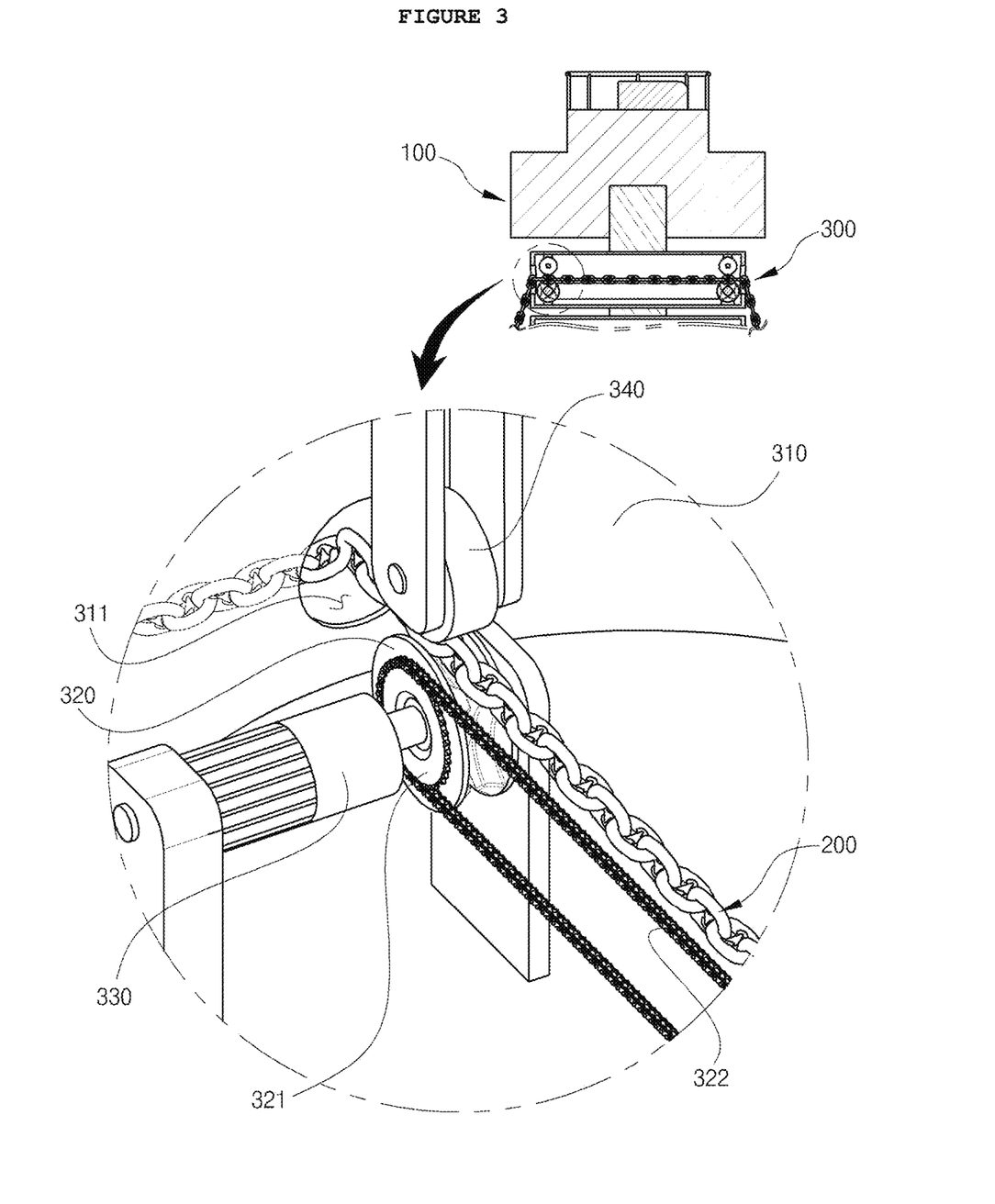
FIG. 3 is a partially enlarged view illustrating the floating offshore mooring chain apparatus for preventing the collision with a ship according to the embodiment of the present invention.

A pair of mooring chain stoppers 320 is provided inside the housing 310. Here, the mooring chain stoppers 320 are spaced apart from each other inside the housing 310 so as to be engaged with the mooring chain 200. With the action of the rotating force, the mooring chain stoppers vary the extended length of the mooring chain 200 in various directions while moving the housing 310 along the mooring chain 200. In operation, when the mooring chain stopper 320 engaged with the mooring chain 200 is rotated in the housing 310, the housing 310 is moved along the mooring chain 200, resulting in the extended length of the mooring chain 200 being varied.

The driving motor 330 is provided to transmit rotational force to the mooring chain stopper 320. The driving motor 330 is connected to one side of the mooring chain stopper 320 to transmit rotational force to the mooring chain stopper 320. The driving motor 330 is powered to operate to transmit a rotating force to the mooring chain stopper 320.

The mooring chain stopper 320 is composed of a sub gear 321 and a chain belt 322 so that the mooring chain stopper is rotated by receiving the rotating force of the driving motor 330.

The sub gears 321 are provided on one-sides of the mooring chain stoppers 320 so that the mooring chain stoppers 320 are rotated by the rotating force from the driving motor 330. The sub gears 321 each have toothed parts so that the sub gear receives the rotating force from the driving motor 330 to rotate the mooring chain stopper 320.

The chain belt 322 is provided to mesh with the sub gear 321. The chain belt 322 is meshed with the sub gear 321 so that the sub gear 321 is rotated by the rotating force transmitted from the driving motor 330. The chain belt 322 is meshed with the outer circumferential surfaces of the sub gears 321 provided on the side surface of the mooring chain stoppers 320 to rotate the sub gear 321 using the rotating force transmitted from the driving motor 330.

A guide roller 340 is provided to be symmetrical to the mooring chain stopper 320 about the mooring chain 200 inside the housing 310 such that the guide roller presses one side of the mooring chain 200 so that the mooring chain 200 is closely abutted against and meshed with the mooring chain stopper 320. Pressing one side of the mooring chain 200 being introduced into the housing 310 allows the rotating force of the mooring chain stopper 320 to be transmitted to the mooring chain 200 without transmission loss while guiding the mooring chain 200 so as not to be deviated from the right position.

A rotary shaft 312 is provided to connect the housings 310 to the lower portion of the buoyant body 100. The rotary shaft 312 is coupled to the lower portion of the buoyant body 100 through the center of the housings 310 such that the respective housings can rotate at 0 to 120 degrees. The rotary shaft 312 allows the housings underneath the buoyant body 100 to rotate at 0 to 120 degrees, thereby allowing the extension direction of the mooring chain 200 to be set at various angles, which flexibly copes with the external force of seawater.

The rotary shaft 312, which is connected to the lower portion of the buoyant body 100 through the center of the housings 310, is provided such that the spider buoy 300 and the buoyant body 100, and adjacent housings 310 are respectively spaced apart from each other.

Guide portions 311 are symmetrically provided on both sides, respectively, of the housing 310, so as to guide the mooring chain 200 such that the extended length of the mooring chain by the mooring chain stopper 320 is varied, wherein the mooring chain 200 being introduced into the housing 310 is meshed with the mooring chain stopper 320.

Figure 4:
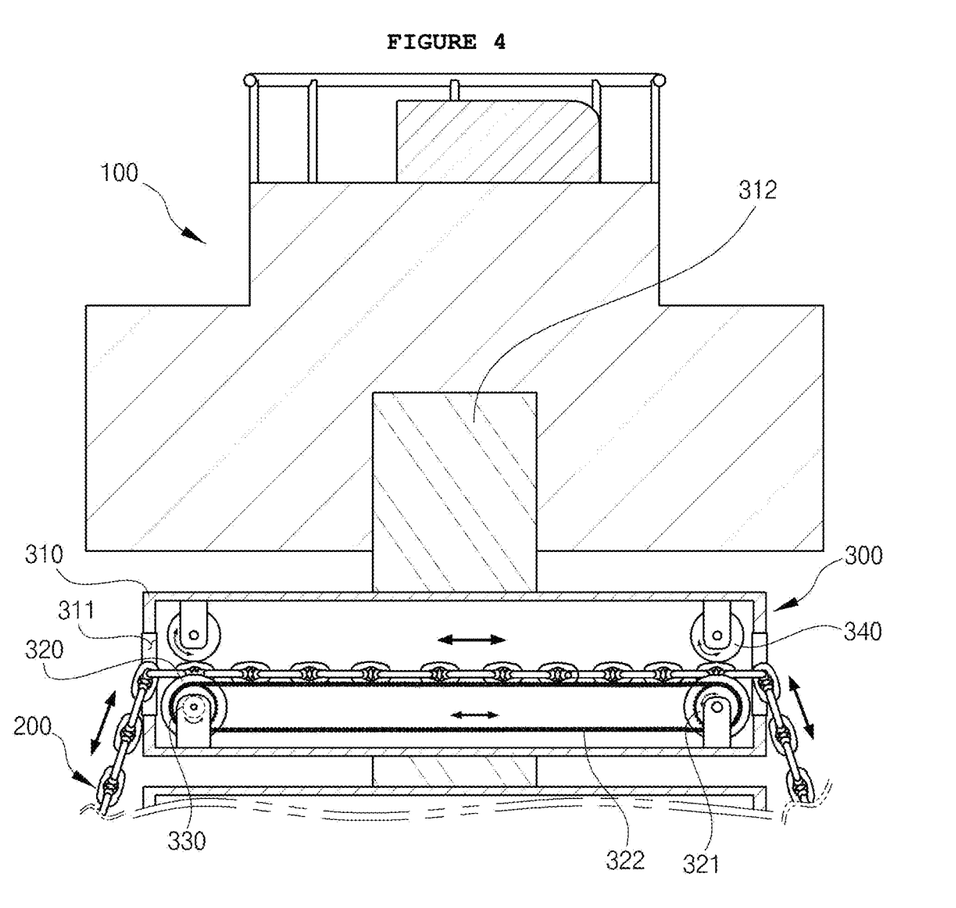
FIG. 4 is an operational view illustrating the floating offshore mooring chain apparatus for preventing the collision with a ship according to the embodiment of the present invention.
Figure 5:
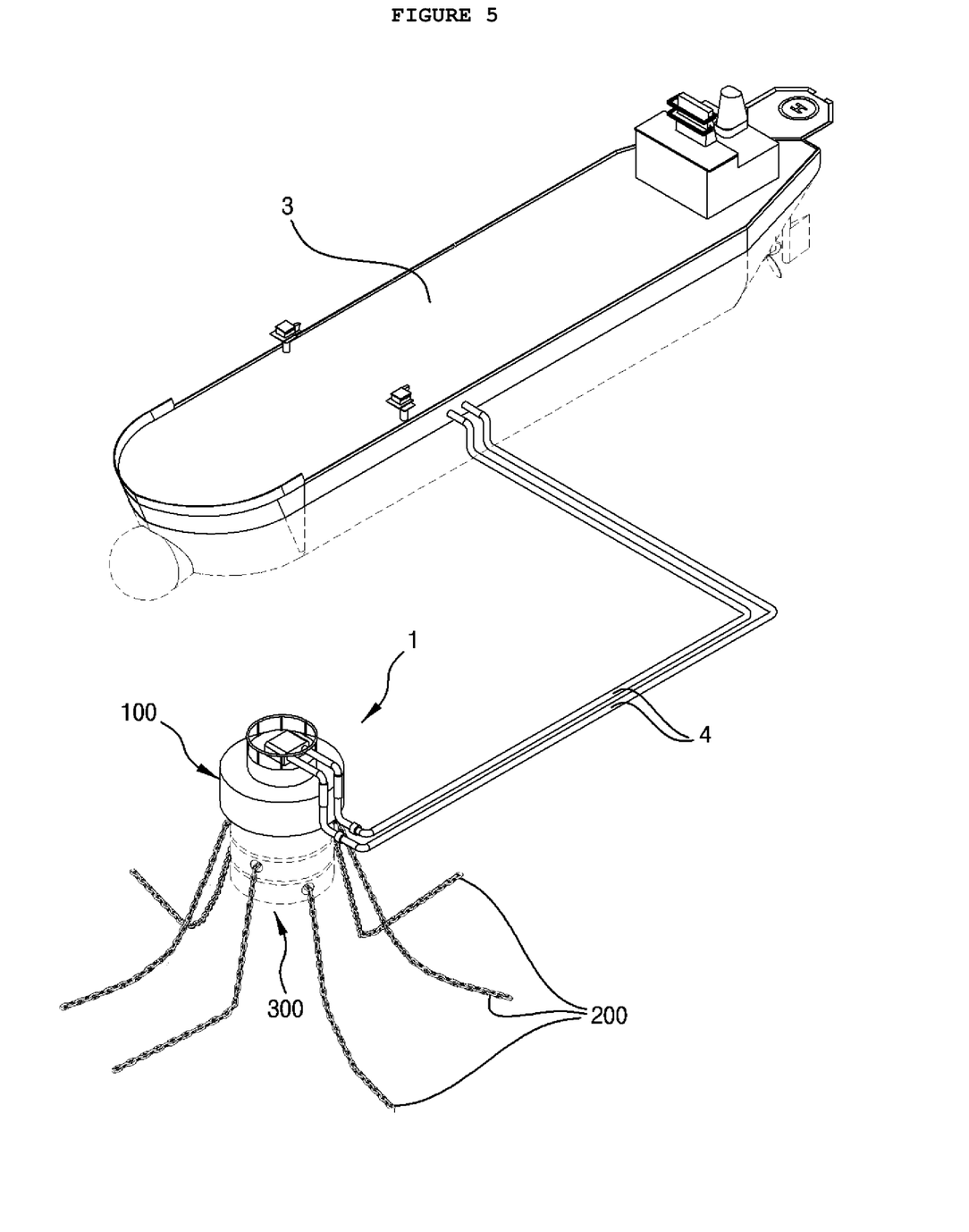
FIG. 5 is a view illustrating the state of using the floating offshore mooring chain apparatus for preventing the collision with a ship according to the embodiment of the present invention.

In the spider buoy 300, as the mooring chain stopper 320 rotates to vary the extended length of the mooring chain 200, the position of the buoyant body 100 is moved to prevent the collision with a transport ship 3 drifting along the water surface by environmental forces.

The spider buoy 300 is made of a metal material and is processed with anti-corrosion treatment to prevent corrosion due to contact of the outer surface with seawater.

On the other hand, although the spider buoy 300 is preferably made of a metal material, it may be made of an impact-resistant reinforced plastic material having corrosion resistance to prevent corrosion due to seawater.

Figure 6:
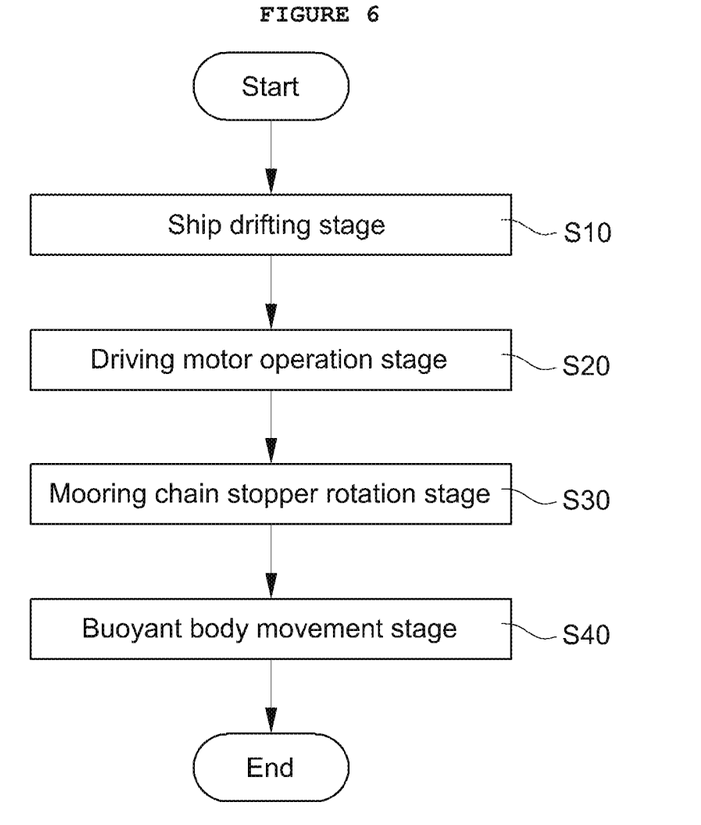
FIG. 6 is a flow chart illustrating the operation method of the offshore mooring chain apparatus.

The operation method according to the operation of the mooring chain apparatus 1 for preventing collision with a ship as described above includes transport ship drift stage (S10), driving motor operation stage (S20), mooring chain stopper rotation (S30), and buoyant body movement stage (S40), as illustrated in FIG. 6.

First, in the transport ship drift stage (S10), a large transport ship 3 that is unable to enter due to a deep draft drifts along the water surface in the sea due to environmental forces.

In the driving motor operation stage (S20), the driving motor 330 of the spider buoy 300 is powered to operate in response to the movement of the transport ship 3.

At this time, the operation of the driving motor 330 may be performed by a user's manual power input, or although not illustrated in the present invention, it may be performed under automated control by a monitoring configuration able to monitor the movement of the transport ship 3, a controller outputting a control signal according to the monitoring result, and the like.

In the mooring chain stopper rotation stage (S30), the mooring chain stopper 320 combined with the driving motor 330 is rotated by receiving a rotating force according to the operation of the driving motor 330.

Then, the sub gear 321 provided to protrude on one side of the mooring chain stopper 320 rotates along with the mooring chain stopper 320 so that the chain belt 322 meshed with the sub gear 321 is circulated to rotate the sub gear 321 on one side of the opposite mooring chain stopper.

That is, the pair of opposite mooring chain stoppers 320 are rotated equally to each other by the action of the sub gears 321 and the chain belt 322.

In the buoyant body movement stage (S40), as the mooring chain stopper 320 rotates along with the mooring chain 200 meshed with the mooring chain stopper in the mooring chain stopper rotation stage (S30), the housing 310 into which the mooring chain stopper 320 is integrated is moved along the extended length of the mooring chain 200 to vary the length of the mooring chain 200 extending to the outside from the housing 310.

At this time, since the buoyant body 100 is integrally coupled to the housing 310 through the rotary shaft 312, it is obvious that the buoyant body 100 also moves along with the housing 310.

That is, the buoyant body 100 connected to the transport ship 3 through the resource supply path 4 is moored by the mooring chains 200 while floating on the sea surface at a position close to the transport ship 3, so that the buoyant body freely moves within the extended length of the mooring chains 200 in response to the movement of the transport ship 3.

Figure 7:
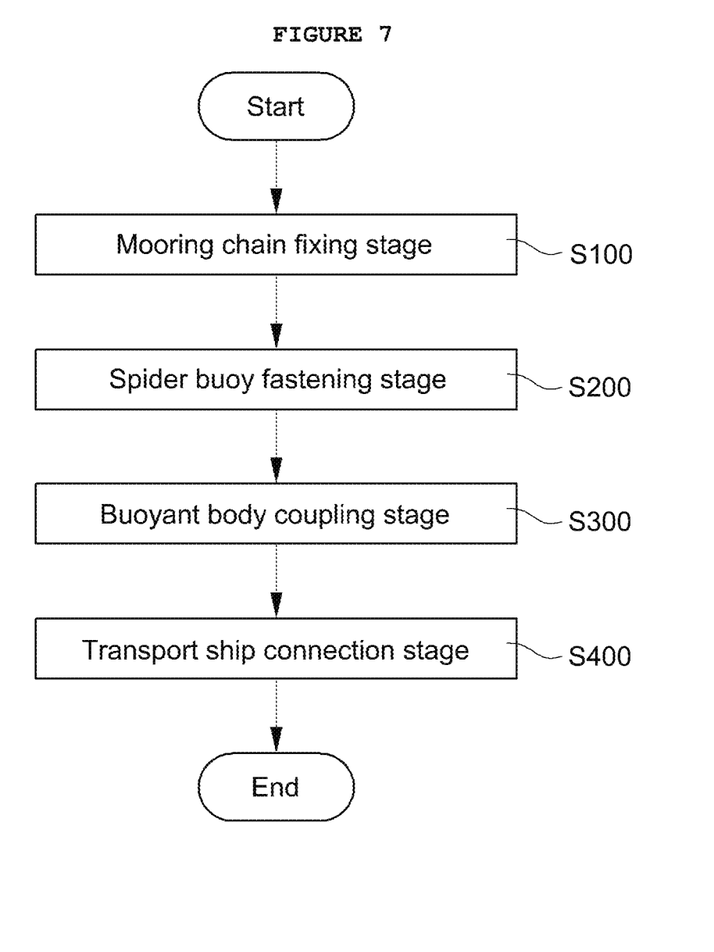
FIG. 7 is a flow chart illustrating the installation method of the offshore mooring chain apparatus.

On the other hand, a method of installing the floating offshore mooring chain apparatus 1 for preventing the collision with a ship according to an embodiment of the present invention may include mooring chain fixing stage (S100), spider buoy fastening stage (S200), buoyant body coupling stage (S300), and transport ship connection stage (S400), with reference to FIG. 7.

The mooring chain fixing stage (S100) is stage in which one end of the mooring chain 200 is fixed to the seabed below the seawater surface at a position near a position where the transport ship 3 is anchored.

The spider buoy fastening stage (S200) is stage in which the spider buoy 300 is fastened by the mooring chain 200. In this stage, the other end of the mooring chain 200, which is not yet fixed in the stage (S100), is fed toward and meshed with the pair of mooring chain stoppers 320 through the guide portion 311 on one side of the housing 310.

Here, the mooring chain 200 is to be pressed by the guide roller 340 provided symmetrically with the mooring chain stopper 320, so that the mooring chain is firmly meshed with the mooring chain stopper 320 with respect to the guide roller 340.

In addition, the mooring chain 200 having passed through the mooring chain stopper 320 is drawn out to the outside of the guide portion 311 on the other side of the housing 310, so that the drawn end of the mooring chain 200 is then fixed to the seabed as in the stage (S100).

Thus, the spider buoy 300 is fastened by the mooring chain 200.

In the buoyant body coupling stage (S300), the buoyant body 100 is coupled to the spider buoy 300 fastened in the stage (S200) through the rotary shaft 312 fastened in step S200.

In the transport ship connection stage (S400), the transport ship 3 is connected to the buoyant body 100 coupled in the stage (S300) through the resource supply path 4.

The foregoing description is merely one embodiment for implementing the floating offshore mooring chain apparatus 1 for preventing the collision with a ship according to the present invention, so the present invention is not limited to the above-described embodiment. Further, it is apparent to any person having ordinary knowledge in the art to which the present invention pertains that various changes may possible without departing from the spirit and scope of the present invention as claimed in following claims.

INDUSTRIAL APPLICABILITY

The present invention is applicable to a field of marine construction in that the floating offshore structure is provided with the plurality of mooring chains extending therethrough for transferring resources to a transport ship so that the mooring chains are fixed to the seabed, thereby positioning the offshore structure in position on the water surface without securing the length of the preliminary mooring chain in consideration of the positional movement of the offshore structure so that the weight and space of the offshore structure, and mooring cost are reduced, and so that active movement of the offshore structure is allowed while the length of the mooring chains is varied, thereby preventing the collision with the transport ship drifting along the water surface.

The invention claimed is:

1. A floating offshore mooring chain apparatus for preventing collision with a ship, the mooring chain apparatus comprising:
   a buoyant body floating on the water surface to transfer resources to a transport ship;
   a plurality of mooring chains fixed to the seabed to locate the buoyant body in position on the water surface; and
   a plurality of spider buoys disposed to a lower portion of the buoyant body such that the mooring chains laterally penetrate through the spider buoys, respectively, and extend toward the seabed in different directions, so that the mooring chains are moved by a rotating force along the extension directions thereof to displace the buoyant body.

2. The floating offshore mooring chain apparatus according to claim 1, comprising a guide roller provided so as to be symmetrical to the mooring chain stopper about the mooring chain inside the housing such that the guide roller presses one side of the mooring chain so that the mooring chain is closely abutted against and meshed with the mooring chain stopper.

3. The floating offshore mooring chain apparatus according to claim 1, wherein each of the spider buoys comprises:
   a plurality of housings provided underneath the buoyant body such that the mooring chains laterally penetrate through the housings, respectively, and extend to the seabed;
   a pair of mooring chain stoppers provided inside the housing such that the mooring chain stoppers are spaced apart from each other so as to be engaged with the mooring chain, wherein in operation, when rotated, the mooring chain stopper engaged with the mooring chain moves the housing along the mooring chain, resulting in the extended length of the mooring chain in different direction being varied; and
   a driving motor connected to one side of the mooring chain stopper to transmit a rotating force to the mooring chain stopper.

4. The floating offshore mooring chain apparatus according to claim 3, further comprising:
   a pair of sub gears respectively provided on one-sides of the mooring chain stoppers so that the mooring chain stoppers are rotated by the rotating force from the driving motor; and
   a chain belt provided so as to be meshed with the sub gears so that the sub gears are rotated by the rotating force transmitted from the driving motor.

5. The floating offshore mooring chain apparatus according to claim 3, comprising guide portions symmetrically provided on both sides, respectively, of the housing, so as to guide the mooring chain such that the extended length of the mooring chain by the mooring chain stopper is varied.

6. The floating offshore mooring chain apparatus according to claim 3, wherein in the spider buoy, as the mooring chain stopper rotates to vary the extended length of the mooring chain, the position of the buoyant body is moved to prevent the collision with a transport ship drifting along the water surface by environmental forces.

7. The floating offshore mooring chain apparatus according to claim 3, wherein the spider buoys comprise a rotary shaft provided to connect the housings to the lower portion of the buoyant body through the center of the housings such that the respective housings are rotatable at 0 to 120 degrees.

8. The floating offshore mooring chain apparatus according to claim 7, wherein the rotary shaft is connected to the lower portion of the buoyant body through the center of the housings such that the spider buoy and the buoyant body, and adjacent housings are respectively spaced apart from each other.

9. A method of operating the floating offshore mooring chain apparatus according to claim 1, the method comprising:
   (A) a stage in which a transport ship drifts along the water surface;
   (B) a stage in which the driving motor of the spider buoy operates in response to the movement of the transport ship;
   (C) a stage in which the mooring chain stopper of the spider buoy rotates in response to the operation of the driving motor in the stage (B); and
   (D) a stage in which the buoyant body moves together with the movement of the housing according to the rotation of the mooring chain stopper in the stage (C).

10. A method of installing the floating offshore mooring chain apparatus according to claim 1, the method comprising:
   (a) a stage of fixing one end of the mooring chain to the seabed;
   (b) a stage of fastening the mooring chain and the spider buoy by allowing another end of the mooring chain to pass through the spider buoy and fix the passed end to the seabed;
   (c) a stage of coupling the buoyant body to the spider buoy fastened in the stage (b); and
   (d) a stage of connecting the transport ship to the buoyant body coupled in the stage (c).

* * * * *